United States Patent Office 3,331,638
Patented July 18, 1967

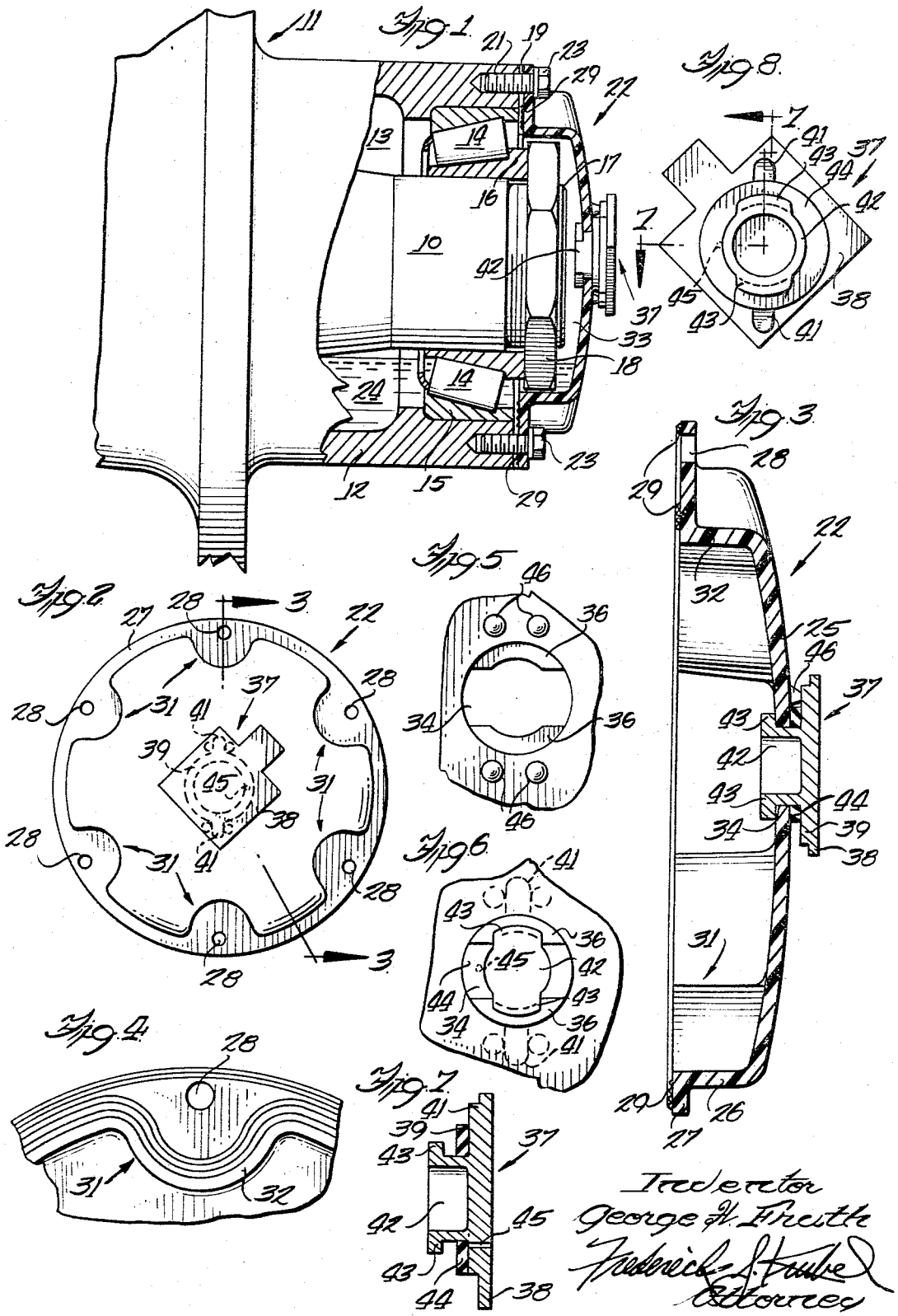

3,331,638
HUB CAP WITH FILL PLUG
George H. Fruth, Oaklawn, Ill., assignor to International
Harvester Company, Chicago, Ill., a corporation of
Delaware
Filed Sept. 15, 1965, Ser. No. 487,377
8 Claims. (Cl. 301—108)

The present invention relates to a novel hub cap for use on wheel and axle assemblies of trucks and trailers and more particularly to a molded plastic hub cap having a centrally positioned fill opening and plastic fill plug to seal the opening.

Trailer wheel and axle assemblies, especially for use on large trailers and semitrailers, involve the rotatable mounting of a wheel on a fixed axle or spindle. The hub of the wheel defines a lubricant reservoir to lubricate the bearing means about the end of the spindle with the lubricant preferably being an oil bath to increase the life of the bearings and spindles. The present invention relates to an improved transparent hub cap having a central fill opening and sealing fill cap for use on the wheel and axle assembly.

Among the objects of the present invention is the provision of a hub cap for a wheel and axle assembly formed of a transparent plastic material, preferably a high impact chemically resistant polycarbonate molding compound. The hub cap is transparent so that the oil level with the hub cap and bearing assembly is clearly visible. To allow for the addition of lubricant to the assembly after external inspection, a fill opening is centrally positioned in the hub cap and a fill cap or plug seals the opening during normal operation.

Another object of the present invention is the provision of a plastic hub cap for a wheel and axle assembly having a filler plug formed of the same or similar plastic material which positively seals the fill opening. The fill plug is locked or unlocked by a 90° turn by hand without the necessity of any tools. The fill plug includes a circular portion formed on the inner surface of the cap with detent arms and a central cylindrical plug projecting from the circular portion having a pair of opposed flexible locking or camming arms. The camming arms ride on inclined camming surfaces on the interior of the hub cap to secure the plug in sealed position. A sealing gasket is positioned to encompass the plug and be compressed between the circular portion and the exterior surface of the hub cap as the camming arms ride on the inclined surfaces.

A further object of the present invention is the provision of a hub cap having a plurality of inwardly extending baffles in the periphery of the raised cap portion of the hub cap. These baffles are molded in the plastic hub cap and provide a "built-in" oil splashing system in the hub cap to aid in efficient lubrication of the bearings for the wheel. The oil is lifted from the bottom of the reservoir by the baffles as the wheel and hub cap rotate and dumped and splashed in the direction of the roller bearings to aid in their constant lubrication.

The present invention also comprehends the provision of two pair of oppositely disposed locking nibs on the exterior surface of the hub cap. The detent arms on the cap ride over and are retained between these nibs to properly orient the fill plug in sealing position in the hub cap.

The present invention further contemplates the provision of a fill plug having a vent opening therethrough which extends through the circular portion of the plug and opens adjacent the cylindrical plug. The gasket over the opening is not under compression and allows relief of any pressure increase within the hub cap to be vented to the exterior while preventing the entry of dirt or other objectionable material into the oil reservoir.

Additional objects of the invention should be apparent to those skilled in the art from the following description when considered with the accompanying drawing.

In the drawing:

FIG. 1 is a fragmentary side elevational view of an axle and wheel assembly with parts in vertical cross section and showing the mounting of the wheel on the axle and the hub cap secured to the wheel hub;

FIG. 2 is a front elevational view of the hub cap and fill plug of the present invention;

FIG. 3 is a generally vertical cross sectional view of the hub cap and fill plug taken on the irregular line 3—3 of FIG. 2;

FIG. 4 is an enlarged view of a portion of the hub cap showing a baffle formed therein.

FIG. 5 is a front elevational view of the central portion of the hub cap showing the fill opening therein with the fill plug omitted;

FIG. 6 is a rear elevational view of the internal surface of the hub cap similar to FIG. 5 but with the fill plug in closed position;

FIG. 7 is a cross sectional view of the fill plug and sealing gasket taken on the line 7—7 of FIG. 8; and FIG. 8 is a rear elevational view of the fill plug and gasket.

Referring more particularly to the drawing wherein is disclosed an illustrative embodiment of the present invention, FIG. 1 discloses a fixed axle having a spindle 10 forming the outer end thereof and upon which a wheel 11 is mounted. The wheel 11 includes a hub 12 forming therein a lubricant reservoir or housing 13 for the bearings 14 and other bearings not shown. An outer race 15 within the hub 12 and an inner race 16 mounted on the spindle 10 cooperate with the bearings 14 to provide rotation of the wheel 11 relative to the axle.

The outer end 17 of the spindle is threaded and one or more lock nuts 18 threadedly engage the spindle to retain the wheel. A sealing gasket 19 is positioned on the outer edge 21 of the hub 12 and a hub cap 22 is secured to the hub by suitable securing means, such as the bolts 23. The hub cap 22 is formed of a transparent high impact, chemically resistant plastic material, such as a polycarbonate molding compound. The plastic material is transparent so that the level of the lubricant 24, preferably an oil, is clearly evident by external inspection.

The hub cap 22 is provided with a bulged central portion 25 joined by sidewall 26 to a radial flange 27 having openings 28 receiving the bolts 23. The flange 27 also has substantially circular raised nibs 29 which engage the sealing gasket 19 to provide a more efficient oil seal. Circumferentially equally spaced around the sidewall 26 are a plurality of baffles 31 which are formed by generally inwardly arcuate walls 32 forming indentations in sidewall 26 and providing rounded internal radial projections extending into the chamber 33 formed by the hub cap 22.

Centrally positioned in the bulged wall 25 of the hub cap 22 is an irregular fill opening 34 (see FIG. 5) which is generally circular with a pair of diametrically opposed inwardly extending camming surfaces 36, 36 formed in the opening 34 which have slightly inclined internal surfaces to cooperate with a fill plug or cap 37. The cap as clearly seen in FIGS. 3 and 7 has a cap portion 38 with a circular portion 39 on the inner surface of the cap provided with a pair of outwardly projecting detent arms 41, 41. A central cylindrical plug 42 extends from the cap portion and terminates with a pair of opposed outwardly extending camming arms 43, 43. An annular sealing gasket 44 encompasses the plug 42 and abuts the circular portion 39 to be clamped between the cap portion and the exterior surface of the bulged wall 25 (FIG. 3).

The fill plug or cap 37 is provided with a small vent opening 45 which extends through the cap portion 38 and the circular portion 39 opening on the inner surface of the circular portion adjacent the junction of the cylindrical plug 42 with the circular portion. The gasket 44 is not compressed between the cap and hub in the inner annular area adjacent the plug 42 and thereby provides sufficient clearance between the gasket and fill plug to permit any increase in air pressure, created by increased temperature, to be slowly vented to the outside of the fill gap. However, the aforementioned clearance is so small that it will permit the passage of a gas, such as air, but will not allow the passage of liquid or solid materials. Thus dirt or other objectionable matter is prevented entry into the oil reservoir.

The fill opening 34 is provided in the hub cap 22 to allow for the addition of lubricant when the level has decreased as evident from external inspection. To close the opening 34, the fill plug 37 is turned so that the flexible camming arms 43, 43 will be received by the irregular opening 34 and the plug 42 is inserted into the hub cap. When the gasket 44 abuts the bulged wall 25, the fill plug is rotated and the arms 43, 43 ride up onto the slightly inclined camming surfaces 36, 36 to draw the fill plug inward and compress the gasket. Rotation is continued until each detent arm 41, 41 rides over one of the two spaced locking nibs 46 formed on the bulged wall 25. Each arm 41 will then be seated between a pair of the locking nibs 46, 46. To release the fill plug, a reverse operation is followed.

When the vehicle having the wheel 11 begins to move, the wheel and the hub cap 22 rotate and the baffles 31 are moved in a generally circular path. Oil is lifted from the bottom reservoir level by the baffles 31 and is dumped and splashed in the direction of the roller bearings to aid in their lubrication. This splashing function is very desirable, especially in cold weather initial start-ups. Utilizing this hub cab design will result in longer bearing life and friction reduction.

Having thus disclosed the invention, I claim:

1. A hub cap for an oil-lubricated wheel hub comprising a transparent cover having a radial flange, a generally annular side wall projecting from one side of said flange, and a slightly bulged outer wall, the outer wall having a central fill opening therein, a pair of inwardly extending opposite camming surfaces, and a fill plug including a cap, a pair of oppositely extending detent arms on the inner surface of the cap, a plug extending from the cap and terminating in a pair of oppositely extending camming arms cooperating with the camming surfaces to clamp the fill plug to the outer wall in a sealed condition, a plurality of circumferentially spaced baffles adapted to agitate and splash oil to aid lubrication of the wheel hub including a plurality of wall portions of said annular side wall, each of said wall portions being curved and extending radially inwardly from the circumference of the annular side wall, and means for securing said cover to a wheel hub including a plurality of fastener-receiving openings through said flange, each of said openings being in radial alignment with a respective baffle.

2. A hub cap as set forth in claim 1, in which a pair of spaced locking nibs are formed in the outer wall, and a detent arm is carried by said fill plug, said detent arm being receivable between said locking nibs when the fill plug is in its fully sealed condition to releasably lock said fill plug to said outer wall in its fully sealed condition.

3. A hub cap as set forth in claim 1, in which an annular sealing gasket is positioned on the fill plug encompassing the plug portion and adapted to be compressed between the cap and the outer wall of the cover.

4. A hub cap as set forth in caim 3, in which said cap has a vent opening therethrough opening adjacent said plug, and said gasket being spaced from said cap to permit the passage of gas through said opening while prohibiting the passage of liquids and solids.

5. A hub cap for an oil-lubricated wheel hub comprising a transparent cover having a radial flange secured to a wheel hub, a slightly bulged outer wall, and a generally annular wall joining the outer wall with the flange, a plurality of inwardly extending circumferentially spaced baffles in the annular side wall, said outer wall having a central fill opening with a pair of opposed inwardly extending camming surfaces, a fill plug having a cap of a diameter greater than said fill opening, a pair of oppositely extending detent arms on the cap, a plug extending inwardly from the cap and terminating in a pair of oppositely extending flexible camming arms cooperating with the camming surfaces, an annular gasket on said plug disposed between said cap and said bulged outer wall, and positioning means on said bulged outer wall cooperating with said detent arms to retain the fill plug in fully sealed position.

6. A hub cap as set forth in claim 5, in which said cap has a vent opening extending therethrough and opening adjacent said plug, said gasket cooperating with said vent opening to allow the venting of air to the outside of the fill plug but preventing entry of foreign matter through said vent opening to said reservoir.

7. A hub cap for an oil-lubricated wheel hub comprising a transparent cover having a radial flange secured to a wheel hub, a generally annular wall, and a slightly bulged portion forming the outer wall, and a plurality of circumferentially spaced, inwardly extending baffles in the annular wall adapted to agitate and splash oil to aid lubrication of the wheel hub, each of said baffles being formed of a substantially semicircular wall curved inwardly from the circumference of the annular wall.

8. A hub cap for an oil-lubricated wheel hub comprising a transparent cover having a radial flange, a generally annular side wall projecting from one side of said flange, and a slightly bulged outer wall, a plurality of circumferentially spaced baffles adapted to agitate and splash oil to aid lubrication of the wheel hub including a plurality of wall portions of said annular side wall, each of said wall portions being curved and extending radially inwardly from the circumference of the annular side wall, and means for securing said cover to wheel hub including a plurality of fastener-receiving openings formed through said flange, each of said openings being in radial alignment with a respective baffle.

References Cited
UNITED STATES PATENTS

| | | |
|---|---|---|
| 362,313 | 5/1887 | Randall. |
| 715,367 | 12/1902 | Giles. |
| 1,270,776 | 7/1918 | Boomershine _____ 308—187 |
| 2,634,882 | 4/1953 | Wittenberg _____ 220—40 |
| 3,114,579 | 12/1963 | Isenbarger _____ 301—108 |

FOREIGN PATENTS

| | | |
|---|---|---|
| 4,612 | 9/1849 | France. |

BENJAMIN HERSH, *Primary Examiner.*

RICHARD J. JOHNSON, *Examiner.*